US010740304B2

(12) United States Patent
Fokoue-Nkoutche et al.

(10) Patent No.: US 10,740,304 B2
(45) Date of Patent: Aug. 11, 2020

(54) DATA VIRTUALIZATION ACROSS HETEROGENEOUS FORMATS

(71) Applicant: International Business Machines Corporation, Armonk, NY (US)

(72) Inventors: Achille Belly Fokoue-Nkoutche, White Plains, NY (US); Oktie Hassanzadeh, Port Chester, NY (US); Anastasios Kementsietsidis, Toronto (CA); Kavitha Srinivas, Rye, NY (US); Michael J. Ward, New Haven, CT (US)

(73) Assignee: International Business Machines Corporation, Armonk, NY (US)

( * ) Notice: Subject to any disclaimer, the term of this patent is extended or adjusted under 35 U.S.C. 154(b) by 720 days.

(21) Appl. No.: 14/467,640

(22) Filed: Aug. 25, 2014

(65) Prior Publication Data
US 2016/0055184 A1 Feb. 25, 2016

(51) Int. Cl.
 G06F 16/21 (2019.01)
 G06F 16/22 (2019.01)
(52) U.S. Cl.
 CPC ........ G06F 16/213 (2019.01); G06F 16/2282 (2019.01)
(58) Field of Classification Search
 CPC ......... G06F 17/30297; G06F 17/30339; G06F 16/213; G06F 16/2282
 USPC ....................................... 707/809
 See application file for complete search history.

(56) References Cited

U.S. PATENT DOCUMENTS

| 5,970,490 A * | 10/1999 | Morgenstern ......... G06F 16/258 |
| 6,546,381 B1 * | 4/2003 | Subramanian .... G06F 16/24542 |
| 6,718,320 B1 * | 4/2004 | Subramanian .... G06F 17/30463 707/719 |
| 7,533,124 B2 * | 5/2009 | Hellman ........... G06F 17/30557 |
| 7,664,727 B2 | 2/2010 | Van Doan et al. |

(Continued)

OTHER PUBLICATIONS

Sundaresan et al.; "Schema Integration of Distributed Databases Using Hyper-Graph Data Model", Information Reuse and Integration Conference 2005, IRI-2005 IEEE International Conference on, Aug. 15-17, 2005, pp. 548-553.
Marvasti et al.; "Pattern Detection in Unstructured Data: An Experience for a Virtual IT Infrastructure", 2013 IFIP/IEEE International Symposium on, Integrated Network Management (IM 2013), Experience Session Paper, May 27-31, 2013, pp. 1048-1053.

(Continued)

*Primary Examiner* — Pierre M Vital
*Assistant Examiner* — Andalib F Lodhi
(74) *Attorney, Agent, or Firm* — Fleit Intellectual Property Law; Thomas S. Grzesik

(57) ABSTRACT

Various embodiments virtualize data across heterogeneous formats. In one embodiment, a plurality of heterogeneous data sources is received as input. A local schema graph including a set of attribute nodes and a set of type nodes is generated for each of the plurality of heterogeneous data sources. A global schema graph is generated based on each local schema graph that has been generated. The global schema graph comprises each of the local schema graphs and at least one edge between at least one of two or more attributes nodes and two or more type nodes from different local schema graphs. The edge indicates a relationship between the data sources represented by the different local schema graphs comprising the two or more attributes nodes based on a computed similarity between at least one value associated with each of the two or more attributes nodes.

20 Claims, 15 Drawing Sheets

(56) References Cited

U.S. PATENT DOCUMENTS

| | | | |
|---|---|---|---|
| 7,685,131 | B2 | 3/2010 | Batra et al. |
| 7,769,792 | B1* | 8/2010 | Burrows ............ G06F 17/30306 707/638 |
| 8,161,075 | B1* | 4/2012 | Long ................ G06F 17/30566 707/793 |
| 8,176,036 | B2 | 5/2012 | Srivastava et al. |
| 8,296,338 | B2 | 10/2012 | Caso et al. |
| 9,824,128 | B1* | 11/2017 | Maluf ............... G06F 17/30554 |
| 2002/0091677 | A1* | 7/2002 | Sridhar ................ G06F 16/972 |
| 2003/0154236 | A1* | 8/2003 | Dar .................... H04L 67/1025 709/201 |
| 2005/0262470 | A1* | 11/2005 | Gavrilov ............ G06F 17/30958 717/100 |
| 2009/0030902 | A1 | 1/2009 | Aharoni et al. |
| 2009/0235152 | A1* | 9/2009 | Rampson ............. G06F 17/246 715/207 |
| 2010/0223268 | A1* | 9/2010 | Papakonstantinou ....................... G06F 17/30864 707/749 |
| 2011/0154184 | A1 | 6/2011 | Mihaila et al. |
| 2012/0059840 | A1 | 3/2012 | Reddy et al. |
| 2012/0124497 | A1 | 5/2012 | Kasoju et al. |
| 2013/0067349 | A1 | 3/2013 | Glaza et al. |
| 2013/0124561 | A1* | 5/2013 | Pradhan ............ G06F 17/30424 707/769 |
| 2013/0191780 | A1 | 7/2013 | Holmes et al. |
| 2013/0246049 | A1* | 9/2013 | Mirhaji ............. G06F 17/30312 704/9 |

OTHER PUBLICATIONS

Chiticariu et al.; "Semi-Automatic Schema Integration in Clio", Proceedings VLDB'07, Proceedings of the 33rd International Conference on Very Large Databases, Sep. 23-28, 2007, pp. 1326-1329.

Goldman, R., et al., "DataGuides: Enabling Query Formulation and Optimization inSemistructured Databases", VLDB '97 Proceedings of the 23rd International Conference on Very Large Data Bases, pp. 436-445, 1997.

Hassanzadeh, O., et al., "Linking Semistructured Data on the Web", Fourteenth International Workshop on theWeb and Databases, pp. 1-6, Jun. 12, 2011.

Nestorov, S., et al., "Representative Objects: Concise Representations of Semistructured, Hierarchical Data", In Proceedings of the Thirteenth International Conference on Data Engineering, pp. 79-90, Apr. 1997, DOI: 10.1109/ICDE.1997.581741.

Hassanzadeh, O., et al., "Helix: Online Enterprise Data Analytics" WWW 2011, Mar. 28-Apr. 1, 2011, ACM 978-1-4503-0637—Sep. 11, 2003.

Rakhmawati, N.A., et al., "On the Impact of Data Distribution in Federated SPARQL Queries," 2012 IEEE Sixth International Conference on Semantic Computing, 978-0-7695-4859-3/12 copyright 2012 IEEE, DOI 10.1109/ICSC.2012.72.

Wikipedia, "Data virtualization", https://en.wikipedia.org/wiki/Data_virtualization, last visited on Jul. 5, 2016, pp. 1-4.

Miller, R., et al., "On Schema Discovery", IEEE Data Engineering Bulletin, Sep. 2003, pp. 1-6, vol. 26, No. 3, pp. 1-6.

About:Place, "About:place", http://dbpedia.org/ontology/Place, last visited on Jul. 5, 2016, pp. 1-2.

* cited by examiner

300

```
1 freebase_company[i] =
2 {
3   "id": "/business/cik/0001...",
4   "name": "Company_A!",
5   "key": ["CMPA","Company_A"],
6   "founded": "1995",
7   "key_people": [
8     {
9       "name": { "Person_A" },
10      "title": "Chairman"
11    }, {
12      "name": { "Person_B" },
13      "title": ["Employee","CEO"]
14    }
15  ]
16 }
```

```
sec_company[j]:
1 <cik> 0001...</cik>
2 <name> Company_A INC</name>
3 <director>
4   <cik> 00012...</cik>
5   <fullname> A_Person</fullname>
6   <number_of_shares> 1995 </number_of_shares>
7 </director>
```

FIG. 4

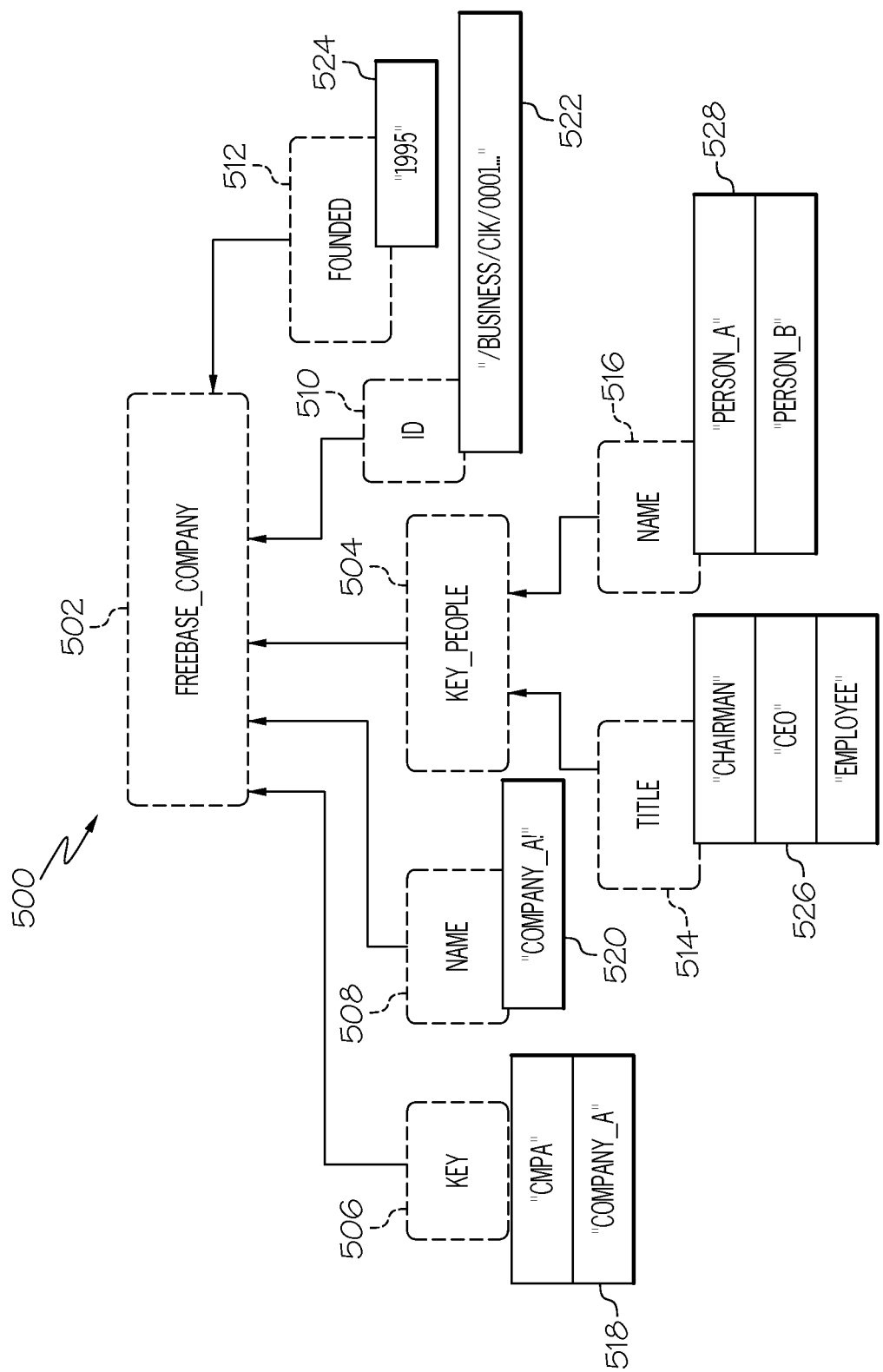

CORPWATCH_COMPANY

| ID | CIK | NAME |
|---|---|---|
| C1 | 51143 | INTERNATIONAL BUSINESS MACHINES |

COMPANY_KEYS

| ID | KEY |
|---|---|
| C1 | IBM |
| C1 | IBM CORP. |

KEY_PEOPLE

| ID | NAME |
|---|---|
| P1 | GINNI ROMETTY |
| P2 | SAM PALMISANO |

COMPANY_KEY_PEOPLE

| ID | PERSON_ID | TITLE |
|---|---|---|
| C1 | P1 | PRESIDENT |
| C1 | P1 | CEO |
| C1 | P2 | CHAIRMAN |

```
1  <http://dbpedia.org/resource/IBM> <rdf:type> <dbpedia-owl:Company> .                                    ~902
2  <http://dbpedia.org/resource/IBM> <rdfs:label> "IBM" .                                                  ~908
3  <http://dbpedia.org/resource/IBM> <dbpprop:secCik> "51143" .                                         ~910
4  <http://dbpedia.org/resource/IBM> <dbpedia-owl:foundingYear> "1911" .                                ~912
5  <http://dbpedia.org/resource/IBM> <dbpedia-owl:director> <http://dbpedia.org/resource/Ginni_Rometty> . ~904
6  <http://dbpedia.org/resource/Ginni_Rometty> <rdfs:label> "Rometty, Ginni" .                          ~914
7  <http://dbpedia.org/resource/Ginni_Rometty> <rdf:type> <dbpedia-owl:Person> .                     ~906 916
8  <http://dbpedia.org/resource/Ginni_Rometty> <foaf:fullname> "Virginia Marie Rometty" .
9  <http://dbpedia.org/resource/Ginni_Rometty> <foaf:lastname> "Rometty" .                               ~918
10 <http://dbpedia.org/resource/Ginni_Rometty> <foaf:firstname> "Virginia" .                             ~920
11 <http://dbpedia.org/resource/Ginni_Rometty> <foaf:firstname> "Ginni" .                                ~922
```

FIG. 9

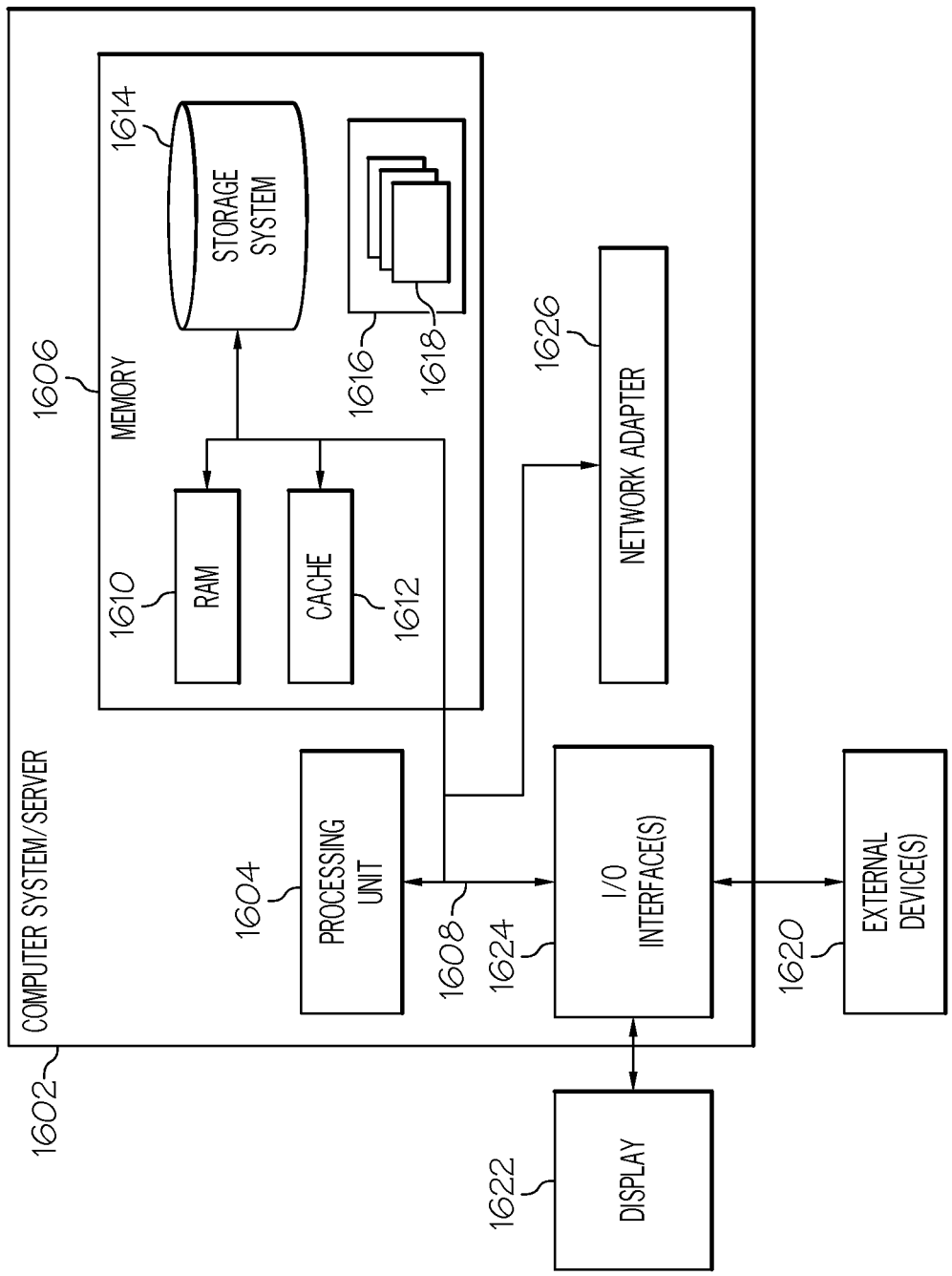

DATA VIRTUALIZATION ACROSS HETEROGENEOUS FORMATS

BACKGROUND

The present disclosure generally relates to data retrieval systems, and more particularly relates to virtualizing data across heterogeneous formats.

Businesses accumulate massive amounts of data from a variety of sources and employ an increasing number of heterogeneous, distributed, and often legacy data sources to store them. Although many data sources are available, navigating the large amounts of data in multiple data sources and correlating those heterogeneous sources with all the relevant data a user is interested in obtaining can be a difficult process. Searching and combining information across these heterogeneous data sources and varying data types requires users to be highly technical and understand how to use relevant query languages for each data source and then manually merge results.

BRIEF SUMMARY

In one embodiment, a method for virtualizing data across heterogeneous formats is disclosed. The method comprises receiving, as input, a plurality of heterogeneous data sources. A local schema graph comprising a set of attribute nodes and a set of type nodes is generated for each of the plurality of heterogeneous data sources. An attribute node corresponds to a schema element in the heterogeneous data source comprising a domain with at least one value and is annotated with the value in the local schema graph. A type node corresponds to a schema element in the heterogeneous data source whose domain is defined recursively through at least one of one or more attribute nodes and one or more other type nodes. A global schema graph is generated based on each local schema graph that has been generated. The global schema graph comprises each of the local schema graphs and at least one edge between at least one or two or more attributes nodes and two or more type nodes from different local schema graphs. The edge indicates a relationship between the data sources represented by the different local schema graphs comprising the two or more attributes nodes based on a computed similarity between at least one value associated with each of the two or more attributes nodes.

In another embodiment, an information processing system for virtualizing data across heterogeneous formats is disclosed. The information processing system comprises a memory and a processor communicatively coupled to the memory. A data processor is communicatively coupled to the memory and the process. The data processor is configured to perform a method. The method comprises receiving, as input, a plurality of heterogeneous data sources. A local schema graph comprising a set of attribute nodes and a set of type nodes is generated for each of the plurality of heterogeneous data sources. An attribute node corresponds to a schema element in the heterogeneous data source comprising a domain with at least one value and is annotated with the value in the local schema graph. A type node corresponds to a schema element in the heterogeneous data source whose domain is defined recursively through at least one of one or more attribute nodes and one or more other type nodes. A global schema graph is generated based on each local schema graph that has been generated. The global schema graph comprises each of the local schema graphs and at least one edge between at least one or two or more attributes nodes and two or more type nodes from different local schema graphs. The edge indicates a relationship between the data sources represented by the different local schema graphs comprising the two or more attributes nodes based on a computed similarity between at least one value associated with each of the two or more attributes nodes.

In yet another embodiment, a computer program product for virtualizing data across heterogeneous formats is disclosed. The computer program product comprises a storage medium readable by a processing circuit and storing instructions for execution by the processing circuit for performing a method. The method comprises receiving, as input, a plurality of heterogeneous data sources. A local schema graph comprising a set of attribute nodes and a set of type nodes is generated for each of the plurality of heterogeneous data sources. An attribute node corresponds to a schema element in the heterogeneous data source comprising a domain with at least one value and is annotated with the value in the local schema graph. A type node corresponds to a schema element in the heterogeneous data source whose domain is defined recursively through at least one of one or more attribute nodes and one or more other type nodes. A global schema graph is generated based on each local schema graph that has been generated. The global schema graph comprises each of the local schema graphs and at least one edge between at least one or two or more attributes nodes and two or more type nodes from different local schema graphs. The edge indicates a relationship between the data sources represented by the different local schema graphs comprising the two or more attributes nodes based on a computed similarity between at least one value associated with each of the two or more attributes nodes.

BRIEF DESCRIPTION OF THE SEVERAL VIEWS OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present disclosure, in which:

FIG. 3 shows one example of a semi-structured data source according to one embodiment of the present disclosure;

FIG. 4 shows another example of a semi-structured data source according to one embodiment of the present disclosure;

FIG. 5 shows one example of a local schema graph generated for the data source of FIG. 3 according to one embodiment of the present disclosure;

FIG. 7 shows one example of a relational data source according to one embodiment of the present disclosure;

FIG. 9 shows one example of a Resource-Description-Framework-based data source according to one embodiment of the present disclosure;

FIG. 16 is a block diagram illustrating one example of an information processing system according to one embodiment of the present disclosure.

DETAILED DESCRIPTION

Data virtualization is an important field within the information management industry. One goal of data virtualization is to provide a unified virtual view of multiple sources of data (regardless of the input data characteristics and access mechanisms) so that users can run queries and build applications as if only one data source is being used. This approach can be seen as an alternative approach to traditional data integration mechanisms such as Extract Transform Load (ETL) or Data Federation. ETL requires a laborious extraction and transformation of all input sources and loading them into a target source, whereas Data Federation maps multiple databases that use the same data model into a single (virtual) federated database. Such traditional approaches have major shortcomings in integrating highly diverse and very large (Big Data) sources.

Embodiments of the present disclosure recognize the difficulty of accessing the vast amounts of data available in heterogeneous data sources by non-technical end users. Various embodiments allow the end user to focus on the exploration of data rather than on the complexities of heterogeneous data sources, incompatible data formats, and query languages. End users need to access data from sources with various formats ranging from simple spreadsheet text files to XML files with no given schema (metadata information that describes instances and elements in the data) to relational and resource description framework (RDF) data that conform to a given well-defined schema, without knowledge about the properties of the data. In addition, one or more embodiments implement data virtualization mechanisms to provide a unified virtual view of multiple sources of data regardless of the input data characteristics and access mechanisms. This allows users to run queries and build applications as if only one data source is being used.

Operating Environment

Figure 1:
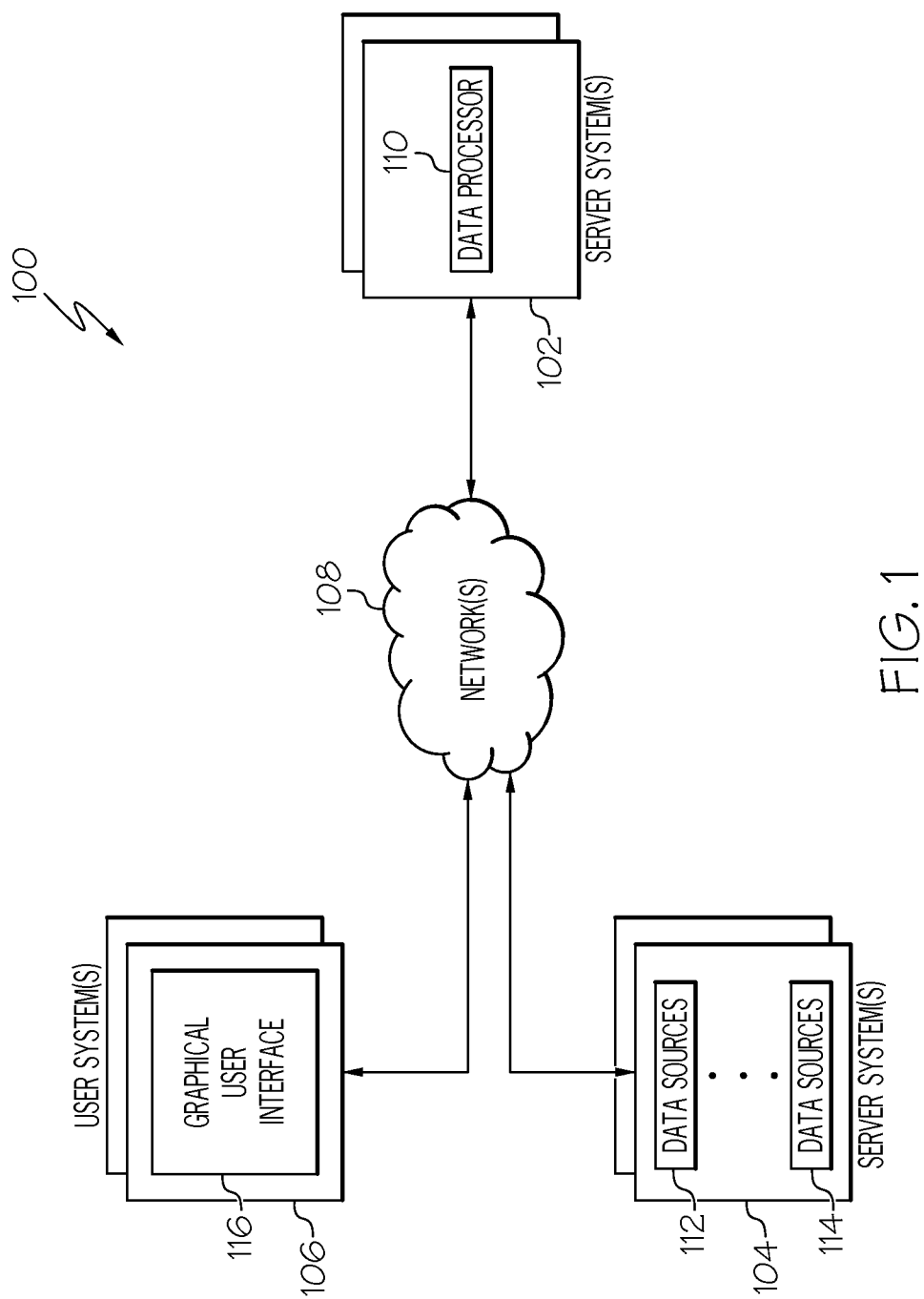
FIG. 1 is a block diagram illustrating one example of an operating environment according to one embodiment of the present disclosure.

FIG. 1 shows one example of an operating environment 100 for virtualizing data across heterogeneous formats. In the example shown in FIG. 1, the operating environment 100 comprises a plurality of information processing systems 102, 104, 106, which can reside within a cloud computing environment and/or a non-cloud computing environment. Each of the information processing systems 102, 104, 106 is communicatively coupled to one or more networks 108. The network 108 can comprise connections such as wire, wireless communication links, and/or fiber optic cables. One or more of the information processing systems 102 comprise a data processor 110. As will be discussed in greater detail below, the data processor 110 provides guided exploration and combination of heterogeneous data sources 112, 114. FIG. 1 shows these data sources 112, 114 being maintained on one or more information processing systems 104 or across multiple systems. The data processor 110 enables users to seamlessly explore heterogeneous data through a combination of keyword searches and a navigation of linked pages (e.g., web pages) that include information about the schemas, data, and semantic links within and across the data sources/sets 112, 114.

In one embodiment, the data processor 110 provides simple unified and tabular (virtual) views over input semi-structured and structured data sources regardless of their data model and format. The input data sources 112, 114 can have a wide variety of data formats, including but not limited to tabular text files (e.g. CSV or XLS), tree-structured (e.g., XML or JSON) documents, relational databases (e.g., DB2), and graph (e.g., RDF) data. The data processor 110 takes in such input sources 112, 114 and as output provides a tabular view of the data that can be navigated through links between the output tables. Each table groups a portion of correlated values in one source. Each column represents one schema element of the input sources where the values in the column are the values associated with the corresponding schema element in the input source.

The data processor 110, in one embodiment, utilizes schema graphs to provide the simple unified and tabular (virtual) views over heterogeneous input data sources. As will be discussed in greater detail below, the data processor 110 reads in each of the input semi-structured and structured data sources, and creates a schema graph for each source. For example, a set of schema trees are created that include all the input schema elements, where the leaves in the tree represent columns of tables (referred to as attributes) in the output tabular view. Each parent node of a leaf represents a table (referred to as a type) with its child nodes as its columns. The type and attribute nodes in the trees are then linked either through existing links in the input data, or links discovered automatically. The resulting graph is global schema graph, which is used to provide unified tabular views over all the input sources.

Figure 2:
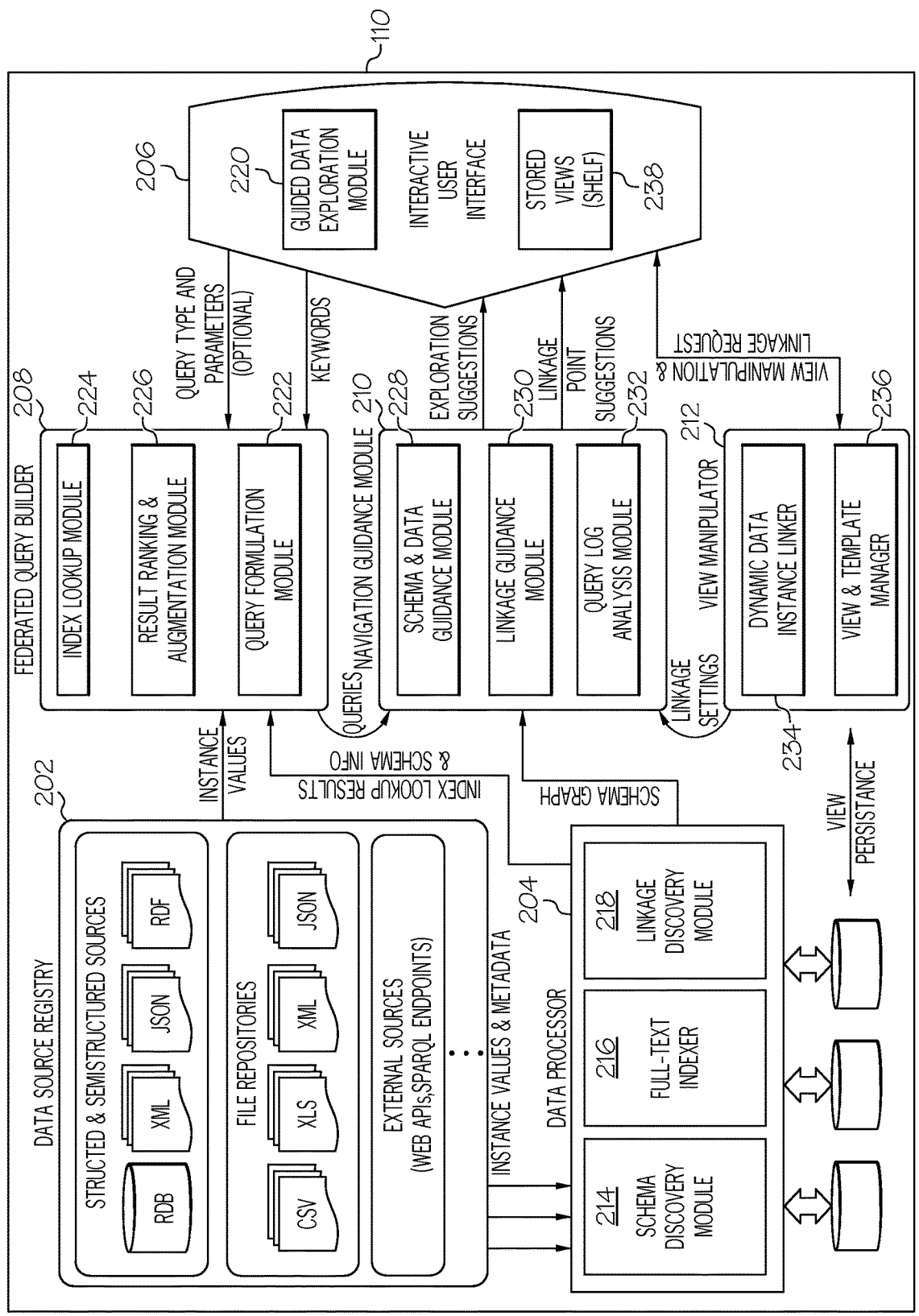
FIG. 2 shows a detailed view of data processor for virtualizing data across heterogeneous formats according to one embodiment of the present disclosure.

FIG. 2 shows a more detailed view of the data processor 110. In the example shown in FIG. 2, the data processor 110 comprises a data source registry 202, a data preprocessor 204, an interactive user interface 206, a federated query builder 208, a navigation guidance module 210, and a view manipulator 212. One or more of these components can reside locally on the information processing system 102 (e.g., server) or be distributed across two or more information processing systems. The data source register 202 defines the input data sources 112, 114, which can be either internal data sources or external data sources. Data sources 112, 114 can be structured sources, semi-structured sources, and/or file repositories comprising data of varying formats such as relational databases, Extensible Markup Language (XML) sources, JavaScript Object Notation (JSON) sources, Resource Description Framework (RDF) sources, Excel files, comma-separated value (CSV) files, and/or the like. The data can further have widely varying characteristics, including, for example, a large number of small records and a small number of large records. Data sources 112, 114 can also be external data sources with application programming interfaces (APIs) that support different query languages. Users can also add additional data sources as needed.

The data preprocessor 204 comprises at least a schema discovery module 214, a text indexer 216, and a linkage discovery module 218. Each of these components is discussed in greater detail below. The data preprocessor 204 prepares the input data sources 112, 114 for analysis. The preprocessor 204 provides other components in the operating environment 100 with a common access mechanism for the data sources 112, 114. For internal data sources, the data preprocessor 204 provides a level of indexing and analysis that depends on the type of data source. Indexing and caching can be bypassed for external data sources to allow fresh data to be retrieved from the external data sources 106 as needed; however, this bypassing is not required. For internal data sources, schema information can be stored and indexed by the data preprocessor 204. For legacy data sources with no given or well-defined schema as well as semi-structured or schema-free data, the data preprocessor 204 can perform schema discovery and analysis.

In the case of relational data sources, the data preprocessor 204 can pick a sample of instance values for each column of a table and issue them as queries to the external data sources to gather possible "senses" (i.e., extended data type and semantic information) of the instance values of the column. The result may be a set of tags associated with each column, along with a confidence value for the tag. For example, "Entity A" may be associated with the type "Company", or the type "Healthcare Industry", or another type from an external data source 106. Depending on the implementation, more than one type may be associated with each instance, and multiple types may either be represented as a set or in some hierarchical or graphical structure.

In addition to schema information, the data preprocessor 204 creates a full-text index across all internal data sources. Different indexing strategies may be used depending on the data source characteristics. For a relational data source, for example, depending on the data characteristics and value distributions, the indexing may be performed over rows, where values are indexed and the primary key of their tuples are stored, or over columns, where values are indexed and columns of their relations are stored. The data preprocessor 204 and its components are discussed in greater detail below.

The interactive user interface 206 enables the data processor 110 to communicate with an end user system 106. For example, the interactive user interface 206 communicates across the network 108 with a graphical user interface 116 residing on the end user system 106. The graphical user interface 116 can include, but is not limited to, a web application or a stand-alone application producing screen images to the end user system 106. The user interface 206 includes a keyword query interface along with templates to show the output of keyword queries, the items picked by the user from the result of keyword queries, and navigation guidance received from a navigation guidance module 210 (discussed in greater detail below). The user can then build stored views 238 shown on a "shelf" in the interface 206, and have the data processor 110 perform complex analysis and linkage of the views to incrementally build more complex views and perform complex analysis tasks.

The interactive user interface 206 comprises or is communicatively coupled to a guided data exploration module 220. The guided data exploration module 220 provides for the uniform searching, navigating, and saving of heterogeneous data. The guided data exploration module 220 also provides an end user with a unified data exploration experience across multiple heterogeneous data sources and multiple data formats. For example, the guided data exploration module 220 facilitates data exploration by allowing the end user to navigate forward and backward through search requests, search results, data samples, and navigation suggestions, until the desired data samples have been found. The guided data exploration module 220 and the uniform searching, navigation, combination, and saving of heterogeneous data are discussed in greater detail in the commonly owned and co-pending U.S. patent application Ser. No. 13/968,486 entitled "Uniform Search, Navigation and Combination of Heterogeneous Data", filed on Aug. 16, 2013, which is hereby incorporated by reference in its entirety.

The federated query builder 208 provides for the querying of all the input sources 112, 114, in a unified way. The federated query builder 208 issues queries for text searches, using an inverted index of data values, to internal data sources, issues queries as APIs to external data sources, consolidates, and analyzes a potentially large and heterogeneous set of query results retrieved from several data sources 112, 114. In addition to retrieving data related to the text search, the federated query builder 208 can issue additional queries to external data sources to gain additional information about unknown data instances returned from the text search. The federated query builder 208 can further rank records returned from the text search based on attribute tags (e.g., "senses") created by the data preprocessor 204.

The query builder 208 comprises a query formulation module 222, an index lookup module 224, and a result ranking and augmentation module 226. The query formulation module 222 receives query string, type, and parameters from the user interface 206 and translates the specification into a set of queries that can run over the original sources and derived meta-data stored through pre-processing. The index lookup module 224 takes a keyword string, parses and analyzes the string, and performs a lookup over the index built by the data preprocessor 204. The result ranking and augmentation module 226 performs ranking of the returned query results, and augments the results with the available metadata and related information.

The navigation guidance module 210 performs tasks related to guiding the user to address the user's information needs. The guidance is provided through suggestions to explore portions of data sources that are identified as relevant to the user based on previous user's queries, similarity of the user query to previous queries, and schema and data found similar to the user's query and query results. The navigation guidance module 210 determines the similarity among records returned from a text search using both schematic and semantic differences. The guidance module 210 uses this similarity to determine which additional fields may produce meaningful search results across instances from both the internal and external data sources 112, 114 using attribute tags (e.g., "senses") created by the data preprocessor 202 and the federated query builder 208. The navigation guidance module 210 also determines which data fields may produce meaningful results when search results are combined. The navigation guidance module 210 can utilize both schematic and semantic links created by the data preprocessor 202 and the federated query builder 208.

The navigation guidance module 210 comprises a schema and data guidance module 228, a linkage guidance module 230, and a query log analysis module 232. The schema and data guidance module 228 goes through schema links available in a global schema graph (built by the data preprocessor 204) to recommend schema elements in input data sources that are related to the user's query. The linkage guidance module 230 goes through the derived similarity links in the global schema graph to recommend portions of data similar to the current query result or specified elements in the input query. This module 230 also assists users in finding what other data can effectively be linked to the current query results to extend the information included in the results. The query log analysis module 232 performs an analysis of all the queries run by previous users. This module 232 also analyzes how the current user is similar to previous users in terms of information needs, and how the current query is similar to a query run by a previous user so the data processor 110 can predict what the next query will be and recommend it to the user.

The view manipulator 212 manages stored views (shelf items) 238 built by a user through the user interface 206. The view manipulator 212 comprises a dynamic data instance linker 234 and a view and template manager 236. The dynamic data instance linker 234 performs dynamic linkage of instance data for given views to build a more complex view. The linkage can be done through a user's request or through a request by the guidance module to help the user navigate to linked pieces of data. The view and template manager 236 stores information related to stored views and templates built by the users so future users of the system can browse through a set of related templates and reuse or extend them.

Global Schema Graph Construction

As discussed above, the data preprocessor 204 generates a local schema graph for each of the input data sources 112, 114, and uses these graphs to generate a global schema graph. The data processor 110 utilizes this global schema graph to provide unified tabular views over all the input sources 112, 114. In one embodiment, input data sources 112, 114 are provided to the data processor 110 as input are processed by the data preprocessor 204. These input data sources 112, 114 can be defined in the data source registry 202. In one embodiment, various different classes of sources are available within the operating environment 100. For example, a first class comprises (semi) structured sources with pre-defined schemas and query APIs, such as relational databases and triplestores. A second class is (online or local) file repositories such as those published by governments (e.g., data.gov or data.gov.uk, or data sources published by U.S. National Library of Medicine), or in cloud-based file repositories. A third class comprises sources directly read from online Web APIs.

The data preprocessor 204 is able to process heterogeneous data based on explicit user needs while avoiding unnecessary or expensive pre-processing operations. In one embodiment, the data preprocessor 204 performs pre-processing operations comprising schema discovery, where input source schema (explicitly specified in the source or automatically discovered by the data processor 110) is represented in a common model in the form of a local schema graph; full-text indexing, where data values and source metadata are indexed; and linkage discovery, which incorporates instance-based matching and clustering of the (discovered) schemas. The outcome of the pre-processing phase is a global schema graph. It should be noted the schema discovery, full-text indexing, and linkage discovery operations can be performed in a scalable and incremental fashion.

The schema discovery process begins by constructing a local schema graph for each of the input sources 112, 114. Schema graphs are used as the common schema representation format that alleviates the differences across the models of different sources. The schema discovery model 214 distinguishes two types of nodes in the schema graphs: (a) attributes, which across models correspond to schema elements whose domain is literal values (e.g., column names in the relational model, PCDATA elements in XML, strings in JSON, etc.); and types, which across models correspond to schema elements whose domain is defined (recursively) through other type or attribute nodes (e.g., tables or schemas in the relational model, intermediate elements in XML trees, etc.).

Given the wide range of sources considered in terms of data models, the local schema graph construction is customized to each data model. In more detail, for semi-structured data with no provided schema, the schema discovery model builds a minimal schema graph (e.g., a tree) that comprises all the possible paths in the semi-structured data instances. That is, nodes in the constructed local schema graph correspond to elements of the semi-structured data, and a path in the schema graph exists if there is at least one data instance having that path. The schema discovery module 214 constructs a simple and concise representation of the structure of the data utilizing techniques that provide a schema that initially facilitates users' understanding of data, while providing ways to incrementally build more complex and accurate models through the user interaction and input).

Figure 6:
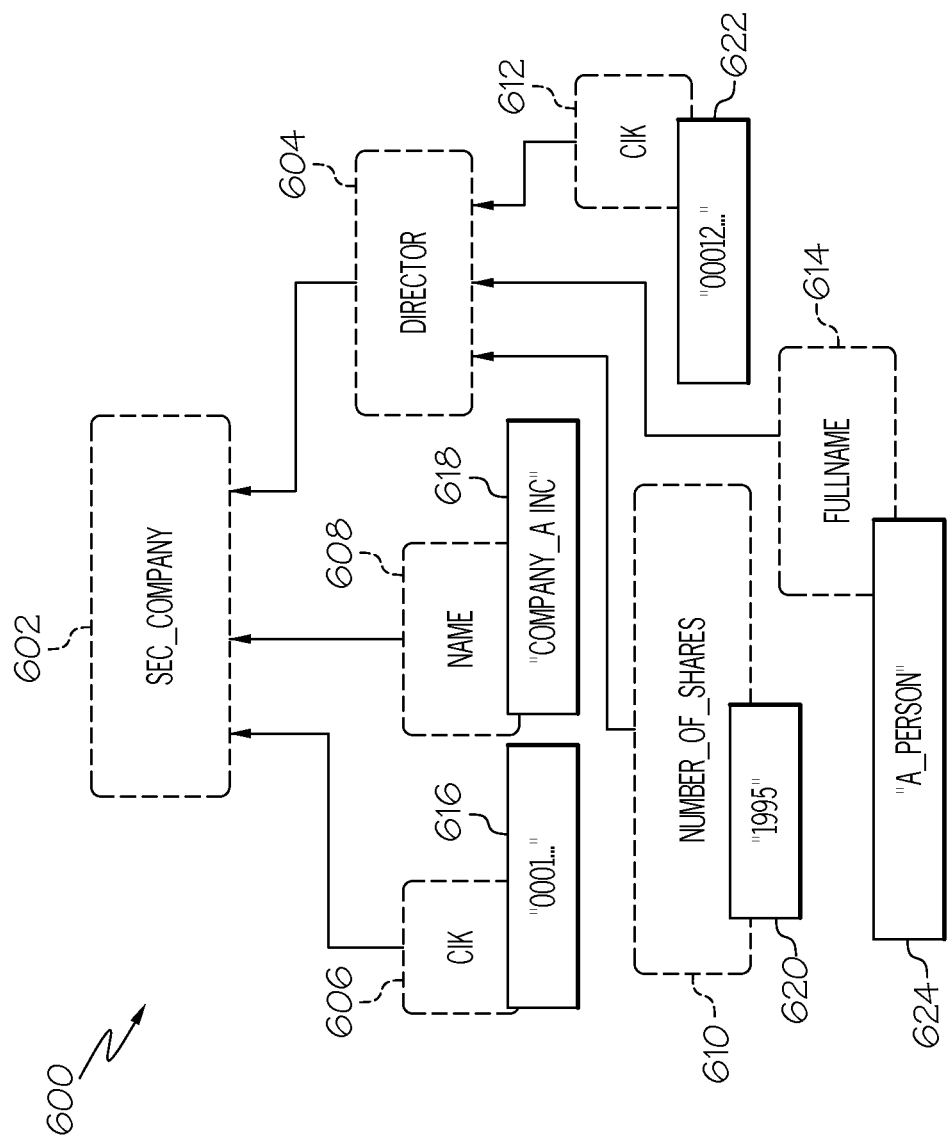
FIG. 6 shows one example of a local schema graph generated for the data source of FIG. 4 according to one embodiment of the present disclosure.

For example, FIGS. 3 and 4 show two examples of different input data sources 300, 400 in JSON and XML formats, respectively. FIG. 4 shows a local schema graph 500 that is constructed by the schema discovery module 214 based on the data in FIG. 3. FIG. 6 shows a local schema graph 600 constructed by the schema discovery module 214 based on the data in FIG. 4. In the graphs 500/600 of FIGS. 5 and 6, the root nodes 502, 602 represent the datasets "freebase_company" and "sec_company" of FIGS. 3 and 4, respectively. Each child node 504 to 516 and 604 to 614 represents a schema element in lines 3 to 13 of FIG. 3 and lines 1 to 7 of FIG. 4, respectively. In FIGS. 5 and 6, the dashed boxes 502, 504, 602, 604 are types while the dash-boxes 506 to 516 and 606 to 614 are attributes. The solid boxes 518 to 528 and 616 to 624 comprise values associated with their corresponding attribute.

Figure 8:
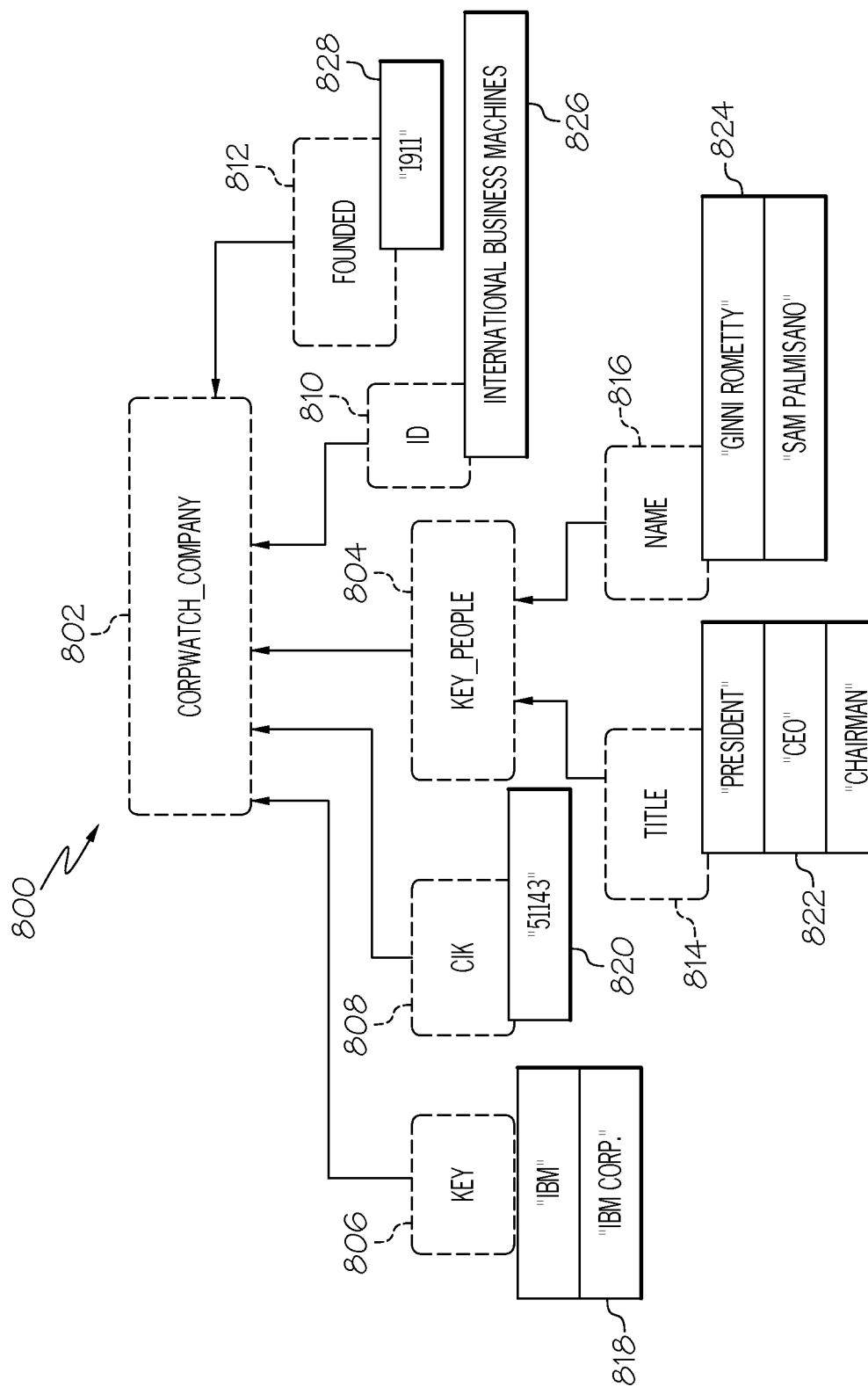
FIG. 8 shows one example of a local schema graph generated for the relational data source of FIG. 7 according to one embodiment of the present disclosure.

For (semi-)structured data with a provided schema (e.g., through available metadata or DDLs), the schema discovery module 214 constructs a schema graph without analyzing instance values. For example, consider the relational source 700 in FIG. 7. The schema discovery module 214 constructs the local schema graph 800 (FIG. 8) for this source 700 by using the table definitions and foreign key relationships. The schema discovery module 214 creates one type per table with table columns becoming attributes of the type, and foreign keys are used to relate different types. For example, FIG. 8 shows that the local schema graph 800 comprises a root node 802 representing the dataset and a plurality of child nodes 804 to 816, where dashed line nodes 802 and 804 are types, and dash-dot line nodes 806 to 816 represent an attribute label that appeared within the dataset. The solid line nodes 818 to 828 represent values associated with the attribute in the input data source's records and are referred to as instances of the attribute. It should be noted that if schema definitions including foreign key information are not available, the schema discovery module 214 creates one type per table with table columns again becoming attributes of the type, and a foreign key discovery process is performed along with link discovery (discussed below) to connect the different tables.

Figure 10:
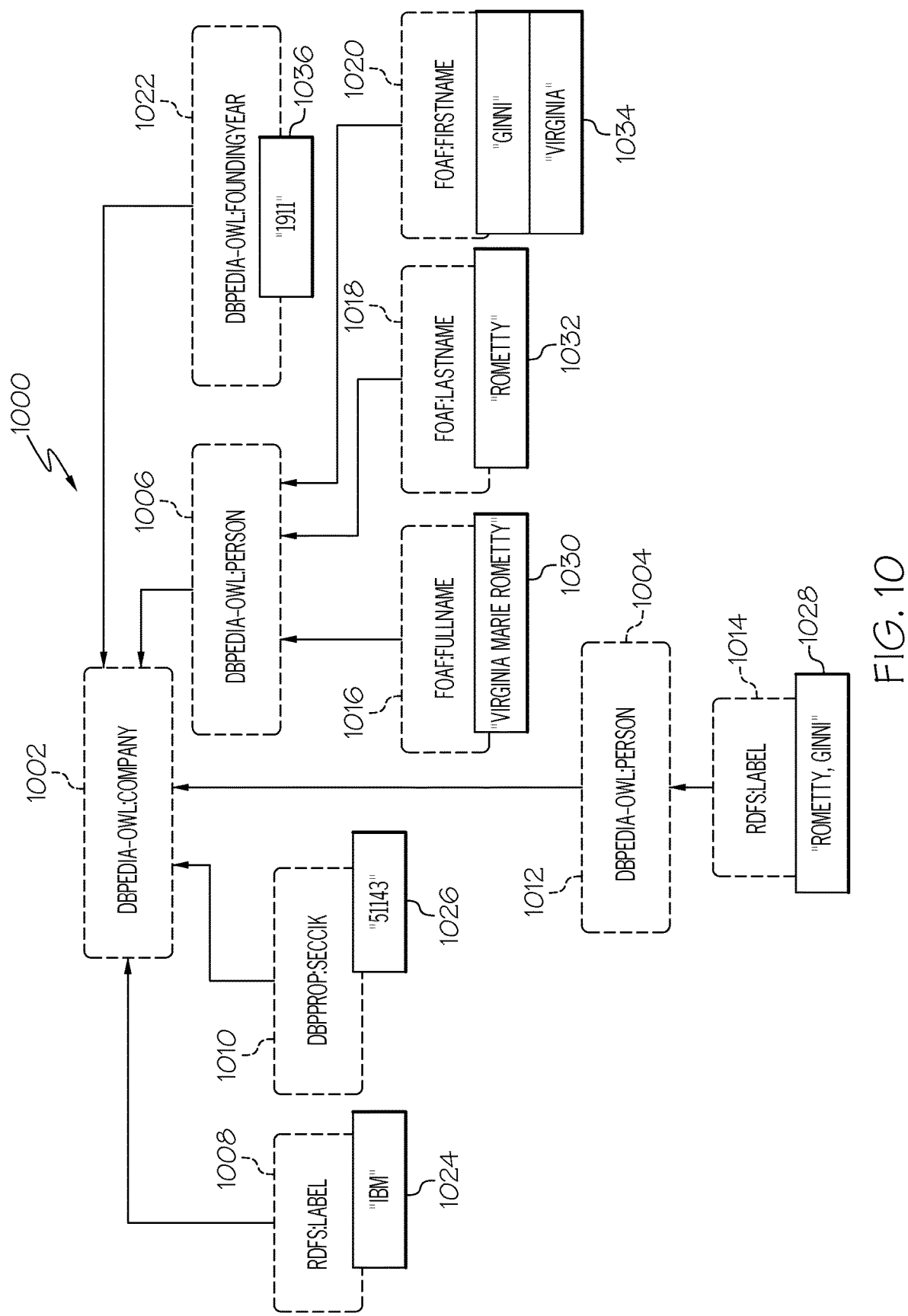
FIG. 10 shows one example of a local schema graph generated for the Resource-Description-Framework-based data source of FIG. 9 according to one embodiment of the present disclosure.

FIG. 9 shows one example of RDF (graph) data 900, and FIG. 10 shows the local schema graph 1000 constructed for this data. In this example, the schema discovery module 214 represents each class 902, 904, 906 with a node 1002, 1004, 1006 representing a type, and its properties 908 to 922 that have literal values become type attributes 1008 to 1022 associated with the node. FIG. 10 also shows that literal values 1024 to 1034 are associated with their attribute nodes 1008 to 1022 within the local schema graph 1000. Properties that link two classes in RDF result in links between the corresponding types. If an RDF schema is given, then it is used by the schema discovery module 214 to construct the local schema graph. In the absence of an RDF schema, the schema discovery module 214 infers the schema graph by going through all of the instance data (RDF triples) and determines the resources, their classes (i.e., the rdf:type statements), their properties, and the properties between classes.

Once the schema graph for each source 112, 114 is constructed, the schema discovery module 214 assigns a Uniform Resource Identifier (URI) to each node in the graph. The assignment is such that it not only captures the relative position of each node within the schema graph, but also captures the provenance of each node, i.e. where the node came from originally (e.g., the name of the source as well as its model). As an example, assume the schema graph 500 in FIG. 5 is derived from a JSON source with name compdata. Then the following URIs are assigned to the attributes of the source:

json://compdata/freebase_company/key
json://compdata/freebase_company/name
json://compdata/freebase_company/key_people/title
json://compdata/freebase_company/key_people/name
json://compdata/freebase_company/id
json://compdata/freebase_company/founded and the following URIs represent the types:

json://compdata/freebase_company
json://compdata/freebase_company/key_people

Similarly, if the relational source in FIG. 7 is registered with name cmpdt and the tables are stored in a schema named db2usr1, rdb://cmpdt/db2usr1/corpwatch_company/name is the URI of the node corresponding to column name in table corpwatch_company.

The indexer 216 assigns a URI to teach each instance that can be used to locate that specific value. FIGS. 5, 6, 8, and 10 show the instance values in the sold line boxes associated with each attribute in the above examples. The indexer 216 views instance values as documents and utilizes one or more Information Retrieval (IR) engines to tokenize and index the instance values. This allows keyword searches to be performed across the input data sources 112, 114 with Boolean queries and fuzzy search capabilities. The indexer 216 can model instance values as documents in various ways. For example, the indexer 216 can treat each instance value as a separate document. In this example, the indexer 216 assigns a URI to each instance value that can be used to locate it. For example, the indexer associates the URI json://compdata/freebase_company[0]/key_people[0]/name[0] with "Person_A" in FIG. 5. In some embodiments, the indexer 216 utilizes a compression mechanism that indexes each distinct value only once for each attribute.

In another example, the indexer 216 treats all instance values of an attribute as a single document. In this example, the indexer 216 associates a URI to the entire document as the document identifier. For example, the values "CMPA" and "Company_A." in FIG. 5 are considered as a single document associated with the URI json://compdata/freebase_company/key. In yet another example, the indexer 216 identifies group values that appear together in one instance of a type, and treats these group values as a single document. This results in row-level indexing for relational data, node-based grouping of instance values for tree-structured (e.g., XML) data, and object-level indexing for graph (RDF) data. In FIG. 5, this approach results in one index entry for the company type instance, and two entries for key_people instances. It should be noted that regardless of the indexing mechanism utilized by the indexer, the attribute URIs are stored in the index to facilitate attribute-based grouping of the keyword search results. Unlike conventional indexing of heterogeneous data, which is usually limited to the indexing of values, the indexing of one or more embodiments also indexes metadata, i.e., the types and attribute names themselves to provide a unified keyword search index.

The last phase in pre-processing is discovering links between different types and attributes within as well as across the schema graphs of different sources 112, 114. Traditional schema-based matching is not effective in matching highly diverse and automatically-constructed schemas where the labels of schema elements are not always representative of their contents, and data come from several sources that use different models and representations. Therefore, the linkage discovery module 218 performs an all-to-all instance-based matching of all the attributes. Scaling the matching process for a large number of attributes and large number of instances per attribute can be a major challenge. Therefore, one or more embodiments scale this problem by casting it into the problem of computing document similarity in information retrieval.

In one embodiment, the linkage discovery module 218 treats each attribute node in a local schema graph as a document, where the instance values for that attribute are treated as the set of terms in the document. The linkage discovery module 218 utilizes Locality Sensitive Hashing (LSH) techniques to scale the computation of pairwise attribute similarity. However, other techniques can also be utilized to scale the computation as well. In this embodiment, the linkage discovery module 218 constructs a fixed small number of signature values per attribute (e.g., based on MinHash or Random Hyperplane) in a way that a high similarity between the set of signatures guarantees high similarity among instance values. This results in efficient comparison of instance values between attributes. The linkage discovery module 218 then creates small buckets of attributes so that similar attributes are guaranteed to be in the same bucket with a high probability. This dramatically reduces the number of pairwise attribute comparisons required for an all-to-all attribute matching.

The attribute-level linkages found within and across data sources are used not only for guided navigation of the sources 112, 114, but also to find type-level linkages and grouping (clustering) of types. In more detail, type clustering is performed to group types that have the same or highly similar attribute sets. For example, all 'address' types of an XML source might create a single cluster, in spite of these addresses appearing at different levels and under different elements of the tree. Type-level linkages induce a similarity graph, where each node represents a type and the weight of an edge connecting two types reflects their similarity. This similarity is the average of (a) the instance-based similarity between the attributes of the two types; and (b) the similarity (such as the Jaccard or the cosine similarity) between the sets of attribute labels of the types. An unconstrained graph clustering algorithm can be used to find clusters of types in the similarity graph. One example of linking attributes found within and across data sources that can be implemented by the linkage discovery module 218 is given in the commonly owned and co-pending U.S. patent application Ser. No. 13/543,872, entitled "Linking Data Elements Based on Similarity Data Values and Semantic Annotations", which is hereby incorporated by reference in its entirety.

Figure 11:
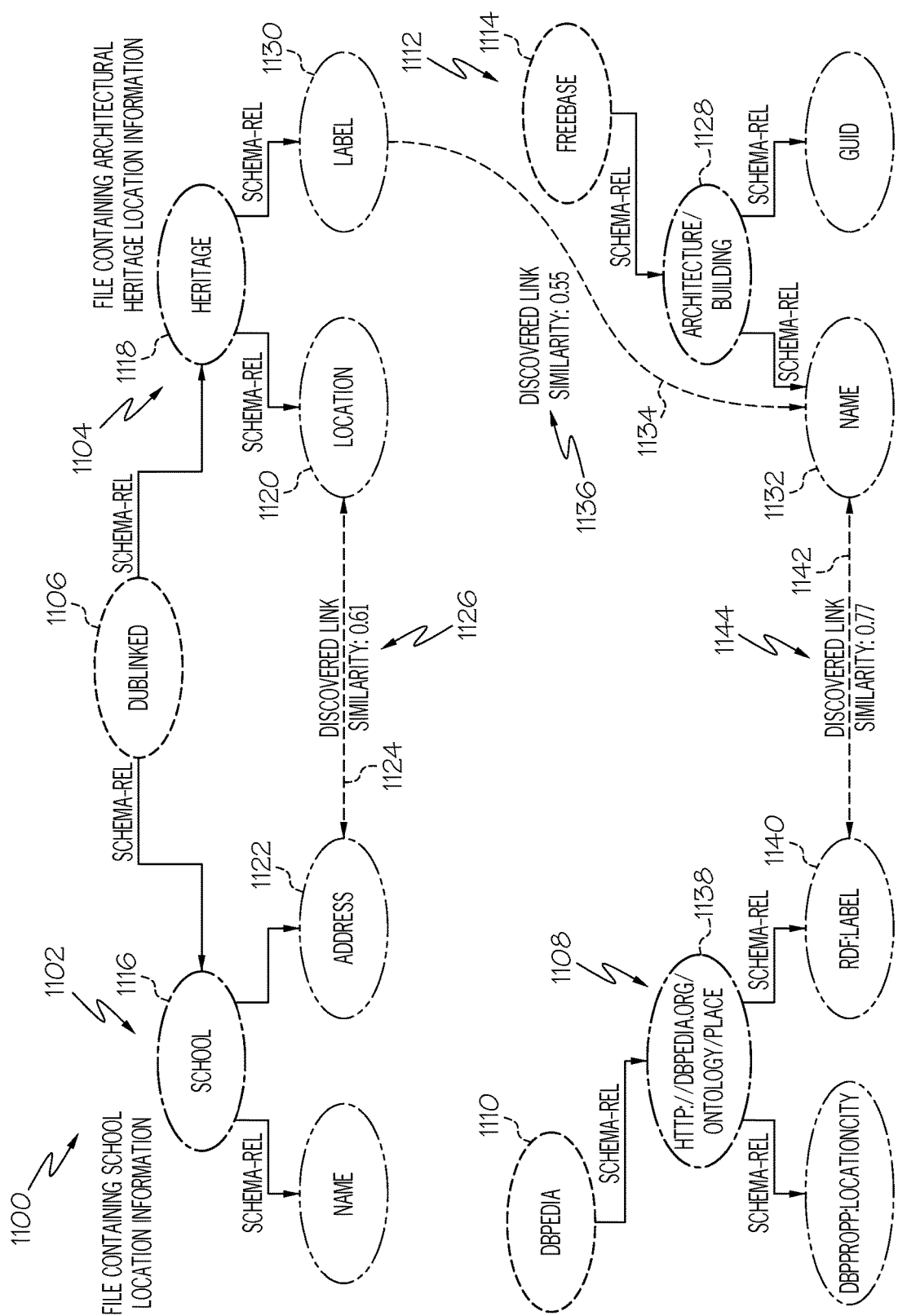
FIG. 11 shows one example of a global schema graph generated from a plurality of local schema graphs according to one embodiment of the present disclosure.

The local schema graphs of all the input sources 112, 114 along with the discovered attribute and type linkages are utilized by the data preprocessor 110 to build a global schema graph. This graph provides a unified view over the input sources, enables navigation, and allows the discovery of related attributes and types through schema and similarity-based linkages. FIG. 11 shows a portion of a global schema graph 1100 constructed for a plurality of heterogeneous data sources based on their local schema graphs and their discovered attribute and type linkages.

In the example shown in FIG. 11, the global schema graph 1100 has been constructed by the data preprocessor 110 based on a first local schema graph 1102 generated for a first dataset (e.g., file) with school location information for the city of Dublin; a second local schema graph 1104 generated for a second dataset with architectural heritage location information for the city of Dublin, where the first and second datasets are from the same data source represented by dashed node 1106; a third local schema graph 1108 generated for a third data source (e.g., RDF graph) represented by dashed node 1110; and a fourth local schema graph 1112 generated for a fourth data source (e.g., JSON-based data source) represented by dashed node 1114.

In particular, a first dataset 1116 (represented by dashed-dotted node) on national heritage sites in the city of Dublin is linked to a second dataset 1118 (represented by dashed-dotted node) in the same source 1106 (represented by dashed node) comprising school locations. These datasets 116, 118 are linked based on the similarity of the address/location attributes 1120, 1122 (represented by dashed-double-dotted nodes) in the two datasets 1116, 1118. The link is a discovered link identified by the linkage discovery module 218, and is represented as a double-arrow-dashed-line 1124 between the address/location attributes 1120, 1124. In one embodiment, this link 1124 is annotated with a similarity value/index 1126 calculated by linkage discovery module 218 during the linkage discovery process discussed above.

The second dataset 1118 is also linked to a fourth dataset 1128 (e.g., a type) represented by a dashed-dotted node that comprises information on architectural buildings from Web knowledge base data source 1114. These datasets 1118, 1128 are linked based on the similarity of the label and name attributes 1130, 1132 in the two datasets 1118, 1128, where LABEL (an attribute in the schema graph of the Heritage data set) is a column in this tabular (CSV) data set, and NAME (an attribute in the schema graph of the Web knowledge base RDF data source) is a property of class/architecture/building in the RDF data. The link is a discovered link identified by the linkage discovery module 218, and is represented as a double-arrow-dashed-line 1134 between the label/name attributes 1130, 1132. In one embodiment, this link 1134 is annotated with a similarity value/index 1136.

The fourth dataset 1128 is linked to a third dataset 1138 (e.g., a type) represented by a dash-dot lined node that comprises information about public locations (Place type in an ontology) from another knowledge base data source 1110. This link is based on the similarity of the name and rdf:label attributes 1132, 1140 in the two datasets 1128, 1138, which are properties of the parent classes (types) in the input RDF data. The link is a discovered link identified by the linkage discovery module 218, and is represented as a double-arrow-dashed-line 1142 between the name/rdf:label attributes 1132, 1140. In one embodiment, this link 1142 is annotated with a computed similarity value/index 1144.

The discovered links 1124, 1134, 1142 implicitly show that the data sets 1116, 1118, 1128, 1138 comprise information about locations, and that there is potentially a connection between school locations and national heritage sites in the city of Dublin. In FIG. 11, two type of links are distinguished, namely explicit links (edges with solid lines and a single arrowhead) that are inferred by looking at individual sources through schema discovery, and discovered links (edges with dashed lines and a double arrow head) that require additional logic and consider multiple sources (linkage discovery). For discovered links, the data preprocessor 110 adds annotations to capture their computed similarity, as well as the method by which the link was discovered (e.g., MinHash, user generated, etc.). The global schema graph governs and guides any user interaction. In one embodiment, interactions with the global schema graph are automatically and internally translated to SPARQL queries. However, this is not required. It should be noted that in some embodiments attribute-level links are extended to type-level links such that links are generated between types. Such links can be added, for example, when several users of the system navigate from one type to another type and navigation and query logs are analyzed to derive this relationship. Also, users can manually establish links between types as well.

Guided Exploration

Figure 12:
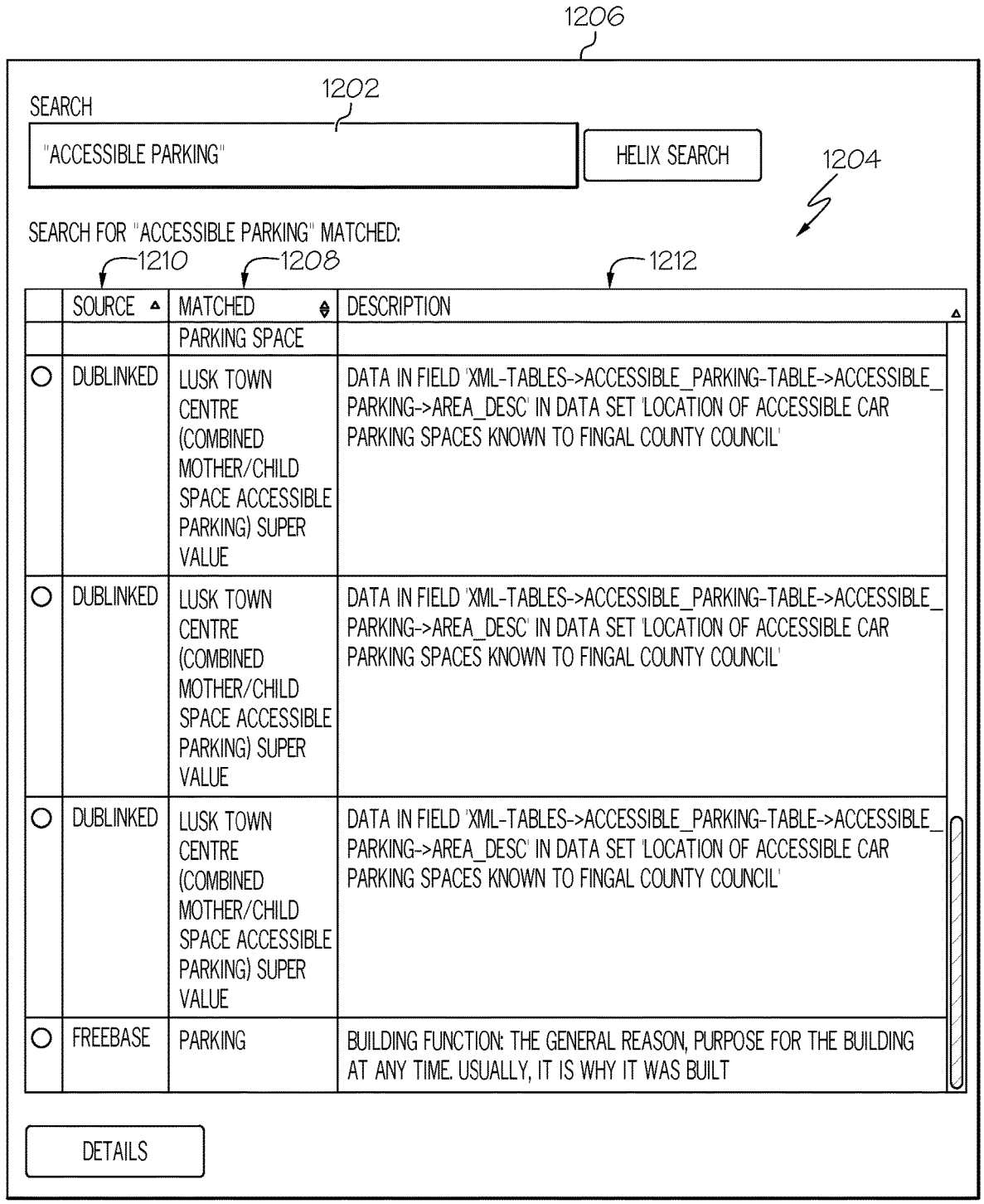
FIG. 12 shows one example of search results generated based on a global schema graph according to one embodiment of the present disclosure.

Once a global schema graph is built, guided data exploration can be performed by the data processor 110 that allows users to construct complex queries iteratively by building on some basic building blocks. Guided exploration comprises, for example, the following components: (1) keyword search, (2) guided navigation, (3) construction of virtual views, and (4) integration across virtual views to build more complex queries. With respect to keyword search, users initiate their guided exploration with a keyword search over the index created by the indexer 216. For example, FIG. 12 shows one example of an interactive user interface 1206 provided by the data processor 110. In this example, a user has entered the keywords "accessible parking" into a search box 1202. The data processor 110 customizes the search engine results 1204 in such a manner that the result set comprises not only the hits from the global schema graph for the input keyword(s) (with each hit being either a type or an attribute hit, and shown in the column 1208 labeled "matched"), but also the name of the data source in which each hit appears (the column 1210 labeled "source"). The search engine results are also customized to provide the precise location of the hit within the source (the column 1212 labeled "description"). The search results can be ranked ordered or sorted by values in any of the columns.

Guided data navigation is an iterative process performed by the data processor 110 that assists users in confirming that data that they are viewing is relevant to their tasks and in discovering closely related data elements. Users initiate navigation by choosing a hit on the search engine results page 1204. The data processor 110 displays a page 1302 within the interactive user interface 1206 with three primary components, a table 1304 comprising sample data for the chosen hit and two lists 1306, 1308 of links to related attributes and types (see FIG. 12). Clicking on one of these links takes the user to a new data navigation screen populated with data and links for the attribute or type clicked on. The presentation is uniform regardless of the data model of the underlying data source. The user is guided to structurally and semantically related attributes and types, reinforced at each step with sample data. The user is able to focus on the data itself rather than how it is represented and accessed.

Figure 13:
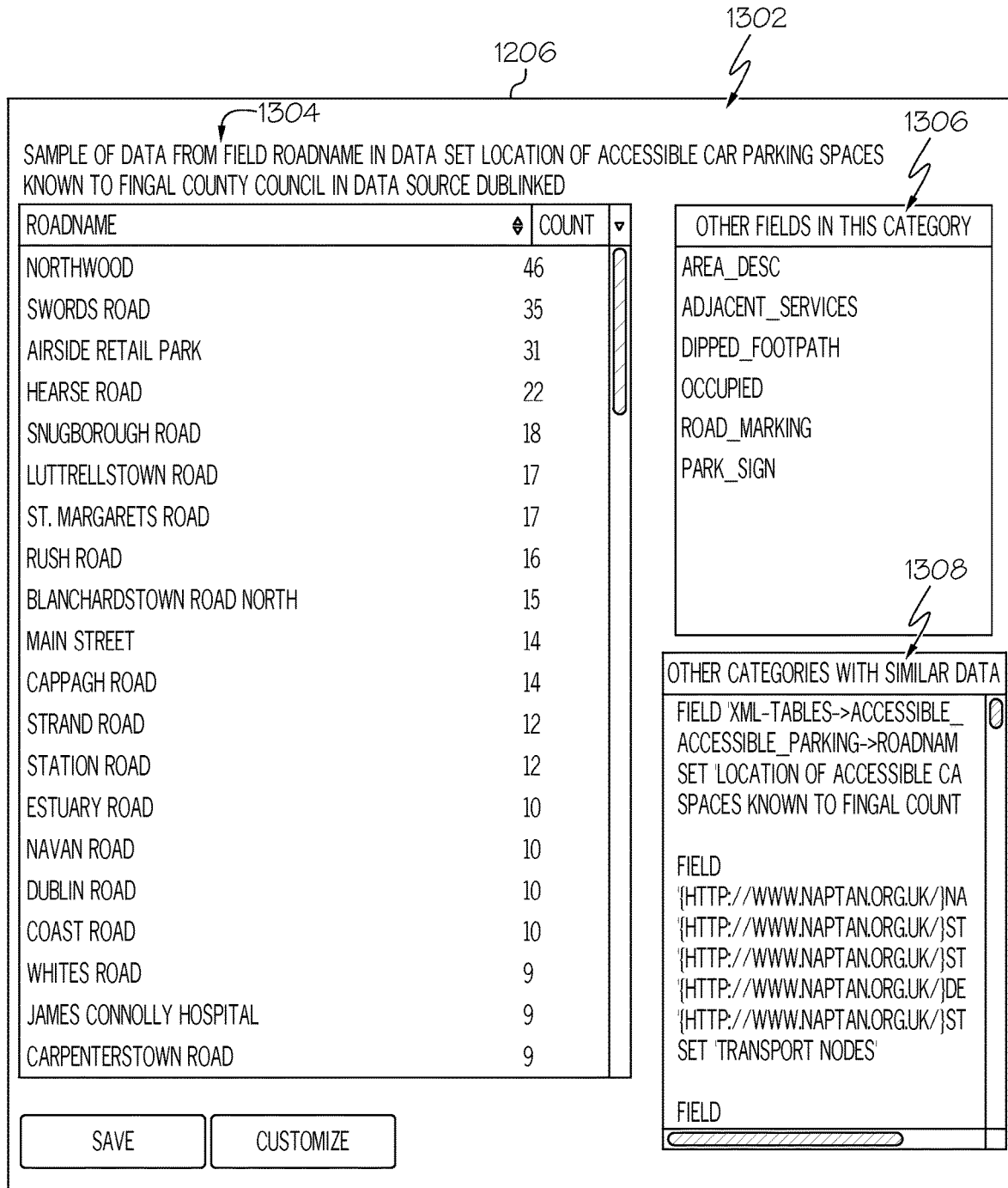
FIG. 13 shows one example of a user interface for guided navigation of data according to one embodiment of the present disclosure.

In one embodiment, the data processor 110 presents a sample of popular instance values to a user when he/she drills down on a hit. This helps users decide if the selected hit is relevant to their task. As discussed above, the data processor 110 indexes both attributes and types in the schema graph. If the hit is on an attribute, data processor 110 shows a sample of its most popular instance values. In FIG. 13, sample data values for attribute dublinked/AccessibleParking/ROADNAME are shown where dublinked/AccessibleParking refers to the type the attribute belongs to, and ROADNAME refers to the attribute itself. If the hit is on a type, the user can explore data associated with that type using schema links.

Regardless of whether the hit reflects a type or an attribute, the data processor 110 displays links found during the schema discovery process discussed above. Schema links inform users about other attributes and types in the vicinity of the hit (i.e., in the same source) and can be relevant for their task. This sort of navigation guides users to the right data even if the original hit was not on the right attribute. The list of schema links is navigable, and ordered by the number of instances in the attribute.

For a given attribute or type hit, the data processor 110 shows links to other attributes or types that were discovered during pre-processing. This list is ordered initially by the similarity score calculated during pre-processing. As with schema links, discovered links are navigable as well, and are similar to recommendations for relevant data. A user validates a link indirectly by clicking on it and using the relevant data from it. In this case, the data processor 110 boosts the link between the two types (the type in the hit and the type the user navigated to from the hit), or two attributes (again, the attribute hit and the one the user navigated to) to the maximal similarity value of 1.0, and annotates the link to indicate that it is user validated. As a result, these links are subsequently ranked higher when users again browse the same hits and their associated links.

The navigation techniques discussed above help users find relevant data after minimal navigation steps. Occasionally, a hit is exactly what the user is looking for; at other times the data of real interest is for a different attribute or type from the same source as the hit; and sometimes one of the discovered links for the hit guides the user to more relevant data in another source. The data processor 110 provides a whole infrastructure to help users zero in on the data they want to use. The navigation processor of one or more embodiments, is more accurate and faster than using a pure-text search-based approach that often lacks both the context of the hits and the connections between hits and other related areas of the search space.

When a user has found an interesting type, he/she can construct a virtual view on that type, and save it in a data shelf. Creating of a virtual view comprises customizing the type on the guided navigation screen/page. At the interface level, the user chooses various attributes of a type in tabular form, and is not aware of the actual data format (e.g., XML, JSON, RDF or RDBMS). The user actions is able to perform projections, filtering and ordering on any of the attributes of a selected type. In one embodiment, a 'virtual' view corresponds to a Basic Graph Pattern (BGP) in SPARQL, which (in a basic form) starts with the template ?x type <T>, where <T> is a type, and adds statements of the form ?x <P> ?y, as the user projects attribute P. Note that at the interface level, the user is not required to be aware of any formal structured query language. The data processor 110 builds up the structured query as the user interacts with a simplified version of the data in its tabular form. Filtering and ordering are likewise internally represented using equivalent SPARQL operators or other operator types.

Once a virtual view has been customized, the user can save it to a data shelf which just saves, for example, a SPARQL query to the user's profile. In the process of saving a virtual view, the user can also annotate it with terms that more accurately describe it. These terms are also added to the full text index (where the 'document' being indexed is now a query), such that subsequent searches in guided exploration can lead to hits on virtual views as well as original datasets. As stated above, the action of saving a virtual view is an indication of the usefulness of the guided navigation step, and the data processor 110 boosts the similarity values of discovered links followed during the construction of the virtual view.

Simple virtual views can be used as building blocks for more complex views. To build such views, the data processor 110 provides at least two operators that correspond loosely to a JOIN and a UNION operation (the two are surfaced to the user as "Link" and "Pool" operations in the user interface 206). The JOIN provided by the data processor 110 is different from a standard JOIN in that it is a semantic JOIN that corresponds to an instance linkage operation between the instance data of different virtual views.

The data sources being joined may not be in the same format, and not all of the formats have uniform query engines (or even have an engine in the case of CSV files or Excel). Therefore, the data processor 110 utilizes the global schema graph as a semantic model that unifies distributed data sources with direct schema mappings from the global schema to each of the data source's schema. Differences in query engines (and languages) are then accommodated by using (a) the global schema-to-local source schema mappings; (b) the SPARQL (or other) query over the global schema defining the view; and (c) knowledge regarding the query language/API associated with the underlying source; to translate the view specification in SPARQL (or other language) to an appropriate query (e.g., SQL for relational, XPath for XML) that is executed over the underlying source and fetches the instance data. For data that does not have a query engine (like CSV or Excel), the data processor 110 houses the data in a standard column-store to account for variable schema across multiple datasets.

With the instance data in place, the data processor 110 performs the actual JOIN operation. Unless specified by the user, the data processor 110 recommends a set of attribute pairs on which the views may be linked. In some embodiment, this recommendation is not purely based on the links found during the linkage discovery process since attribute and type similarity does not always imply that instance-level linkages exist. For instance, two types maybe linked because of similarities at the term level (e.g., based on common usage of the term Bank), but actual instance values might differ (e.g., Bank of America versus Apple Bank). Therefore, in one embodiment, linkage point recommendations can be based on automatic identification of these points as discussed in Hassanzadeh et al. "Discovering Linkage Points over Web Data", PVLDB, 6(6):444-456, 2013, which is hereby incorporated by reference in its entirety.

Figure 14:
FIG. 14 shows one example of constructing a virtual view for data of interest according to one embodiment of the present disclosure.

For example, the data processor 110 recommends a pair of attributes as a linkage point if they can effectively be used to link instances of the two types. The linkage points are ranked based on their strength, which reflects the ability to establish a reasonable number of one-to-one links between the instances. In one embodiment, the data processor 110 considers all the attributes of the type in the view, not just those explicit in the stored query. The user can then choose a pair (or pairs) of the recommended attributes. The data processor 110 invokes its dynamic data instance linker 234 that uses, for example, fuzzy matching techniques to link the views and presents the results 1402 (FIG. 14) to the user, together with a confidence score 1404. The user can accept the results 1402 by saving them to the shelf or go back and choose different or additional linkage points and try again. When a new view is saved, internally the SPARQL (or other) algebra describing the view also records the selected linkage points. In some embodiment, since each view is a BGP in SPARQL (or other language), linkage points might occur between variables that don't necessarily have the same name in the SPARQL. The linkage, in on embodiment, is therefore expressed as a filter that calls a JOIN operation on the two variables that are being joined.

Operational Flow Diagram

Figure 15:
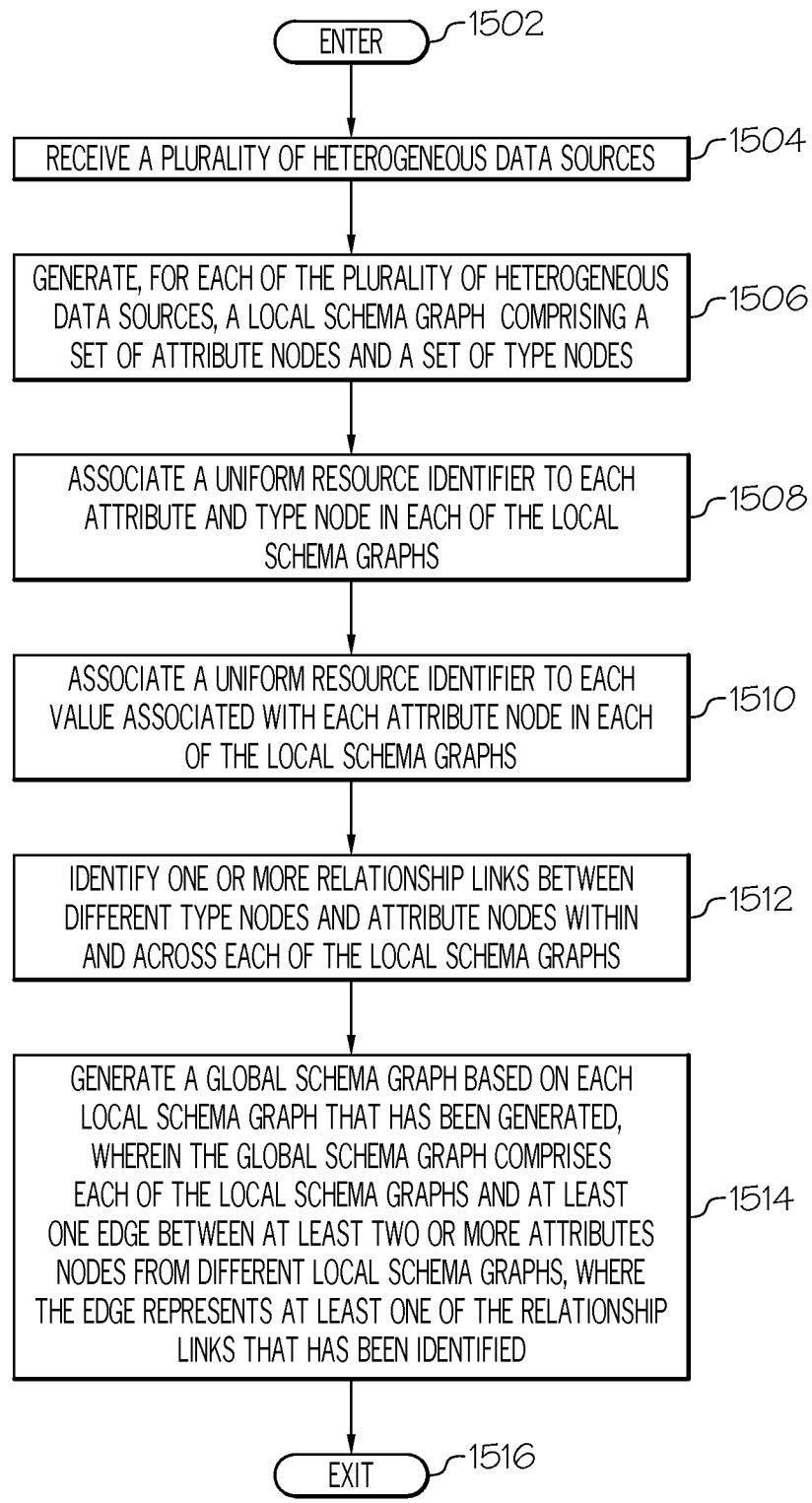
FIG. 15 is an operational flow diagram illustrating one example of a process for virtualizing data across heterogeneous formats according to one embodiment of the present disclosure.

FIG. 15 is an operational flow diagram illustrating one example of a process for virtualizing data across heterogeneous formats. The operational flow diagram of FIG. 15 beings at step 1502 and flows directly to step 1504. The data processor 110, at step 1504, receives a plurality of heterogeneous data sources as input. The data processor 110, at step 1506, generates a local schema graph for each of the plurality of heterogeneous data sources. Each local schema graph comprises a set of attribute nodes and a set of type nodes. An attribute node corresponds to a schema element in the heterogeneous data source comprising a domain with at least one value. The attribute node is annotated with this value(s) in the local schema graph. A type node corresponds to a schema element in the heterogeneous data source whose domain is defined recursively through at least one of one or more attribute nodes and one or more other type nodes.

The data processor 110, at step 1508, associates a uniform resource identifier to each attribute and type node in each of the local schema graphs. The data processor 110, at step 1510, also associates a uniform resource identifier to each vale associated with each attribute node in each of the local schema graphs. The data processor 110, at step 1512, identifies one or more relationship links between different type nodes and attribute nodes within and across each of the local schema graphs. The data processor 110, at step 1514, generates a global schema graph based on each local schema graph that has been generated. The global schema graph comprises each of the local schema graphs and at least one edge between two or more attributes nodes from different local schema graphs. The edge represents at least one of the relationship links that has been identified. The control flow exits at step 1516.

Information Processing System

Referring now to FIG. 16, this figure is a block diagram illustrating an information processing system that can be utilized in various embodiments of the present disclosure. The information processing system 1602 is based upon a suitably configured processing system configured to implement one or more embodiments of the present disclosure. Any suitably configured processing system can be used as the information processing system 1602 in embodiments of the present disclosure. The components of the information processing system 1602 can include, but are not limited to, one or more processors or processing units 1604, a system memory 1606, and a bus 1608 that couples various system components including the system memory 1606 to the processor 1604.

The bus 1608 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Although not shown in FIG. 16, the main memory 1606 includes at least the data processor 2 and its components discussed above with respect to FIGS. 1 and 2. Each of these components can reside within the processor 1604, or be a separate hardware component. The system memory 1606 can also include computer system readable media in the form of volatile memory, such as random access memory (RAM) 1610 and/or cache memory 1612. The information processing system 1602 can further include other removable/non-removable, volatile/non-volatile computer system storage media. By way of example only, a storage system 1614 can be provided for reading from and writing to a non-removable or removable, non-volatile media such as one or more solid state disks and/or magnetic media (typically called a "hard drive"). A magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus 1608 by one or more data media interfaces. The memory 1606 can include at least one program product having a set of program modules that are configured to carry out the functions of an embodiment of the present disclosure.

Program/utility 1616, having a set of program modules 1618, may be stored in memory 1606 by way of example, and not limitation, as well as an operating system, one or more application programs, other program modules, and program data. Each of the operating system, one or more application programs, other program modules, and program data or some combination thereof, may include an implementation of a networking environment. Program modules 1618 generally carry out the functions and/or methodologies of embodiments of the present disclosure.

The information processing system 1602 can also communicate with one or more external devices 1620 such as a keyboard, a pointing device, a display 1622, etc.; one or more devices that enable a user to interact with the information processing system 1602; and/or any devices (e.g., network card, modem, etc.) that enable computer system/server 1602 to communicate with one or more other computing devices. Such communication can occur via I/O interfaces 1624. Still yet, the information processing system 1602 can communicate with one or more networks such as a local area network (LAN), a general wide area network (WAN), and/or a public network (e.g., the Internet) via network adapter 1626. As depicted, the network adapter 1626 communicates with the other components of information processing system 1602 via the bus 1608. Other hardware and/or software components can also be used in conjunction with the information processing system 1602. Examples include, but are not limited to: microcode, device drivers, redundant processing units, external disk drive arrays, RAID systems, tape drives, and data archival storage systems.

Non-Limiting Examples

As will be appreciated by one skilled in the art, aspects of the present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method, by at least one information processing system, for virtualizing data across heterogeneous formats, the method comprising:
   receiving, as input, a plurality of heterogeneous data sources;
   generating, independent of receiving a query to be performed on the plurality of heterogeneous data sources and after receiving the plurality of heterogeneous data sources as input and for each of the plurality of heterogeneous data sources, a local schema graph comprising a set of attribute nodes and a set of type nodes corresponding to data within the heterogeneous data source, the local schema graph being separate and distinct from the heterogeneous data source, wherein an attribute node corresponds to a schema element in the heterogeneous data source comprising a domain with at least one value and is annotated with the value in the local schema graph, and wherein a type node corresponds to a schema element in the heterogeneous data source whose domain is defined recursively through at least one of one or more attribute nodes and one or more other type nodes;
   generating, independent of receiving a query to be performed on the plurality of heterogeneous data sources, a global schema graph based on each local schema graph that has been generated, wherein the global schema graph comprises each of the local schema graphs and their components and further comprises and at least one edge between at least one of two or more attributes nodes and two or more type nodes from different local schema graphs, and wherein the edge indicates a relationship between the data sources represented by the different local schema graphs comprising the two or more attributes nodes based on a computed similarity between at least one value associated with each of the two or more attributes nodes;
   after the global schema graph has been generated, receiving a query to be performed on the heterogeneous data sources through a user interface;
   presenting a plurality of search results obtained from one or more of the plurality of heterogeneous data sources based on the global schema graph; and
   providing guided data navigation of the search results through the user interface by
   displaying, for a search result selected from the plurality of search results, sample data and links to related attributes or types, wherein the links to the related attributes or types are selectable by a user through the user interface, and
   displaying, for a selected link to one or more of the related attributes or one or more of the types, sample data of the one or more attributes or the one or more types associated with the selected link, and further displaying links to related attributes or types.

2. The method of claim 1, wherein two or more of the plurality of heterogeneous data sources comprises a different one of:
   structured data;
   semi-structured data;
   relational data; and
   Resource Description Framework-based data.

3. The method of claim 1, wherein generating the local schema graph comprises:
   determining that the heterogeneous data source comprises one of structured and semi-structured data;
   identifying a plurality of elements in the one of structured and semi-structured data and a value associated with each element;
   generating at least one root node, wherein the root node is a type node and represents the heterogeneous data source;
   generating a node for each of the plurality of elements, wherein the node is one of an attribute node and a type node; and
   annotating each attribute node with the value associated with the element represented by the attribute node.

4. The method of claim 1, wherein generating the local schema graph comprises:
   determining that the heterogeneous data source comprises relational data;
   identifying at least one table in the relational data;
   identifying each column within the table;
   generating a type node representing the table;
   generating an attribute node representing each column within the table;
   annotating each attribute with at least at least one value in a record of the table; and
   generating an edge between each attribute node and the type node.

5. The method of claim 4, wherein generating the local schema graph further comprises:
   identifying at least one additional table in the relational data;
   generating at least one additional type node representing the additional table; and
   generating an edge between the type node and the additional type node based on at least one foreign key relationship between the table and the additional table.

6. The method of claim 1, wherein generating the local schema graph further comprises:
   determining that the heterogeneous data source comprises Resource Description Framework-based data;
   identifying at least one class in the Resource Description Framework-based data;
   identifying each property with at least one value in the Resource Description Framework-based data associated with the class;
   generating a type node for the class;
   generating an attribute node for each property that has been identified; and annotating each attribute node with the at least one value associated with the property represented by the attribute node.

7. The method of claim 1, further comprising:
tokenizing and indexing each value from each local schema graph; and
associating a uniform resource identifier with each value from each local schema graph based on the tokenizing and indexing.

8. The method of claim 1, wherein generating a global schema graph further comprises:
annotating the edge with a measure of the similarity.

9. The method of claim 1, wherein generating the local schema graph further comprises:
associating at least one uniform resource identifier to each of the set of attribute nodes and the set of type nodes.

10. An information processing system for virtualizing data across heterogeneous formats, the information processing system comprising:
a memory;
a processor communicatively coupled to the memory; and
a data processor communicatively coupled to the memory and the processor, wherein the data processor is configured to perform a method comprising:
receiving, as input, a plurality of heterogeneous data sources;
generating, independent of receiving a query to be performed on the plurality of heterogeneous data sources and after receiving the plurality of heterogeneous data sources as input and for each of the plurality of heterogeneous data sources, a local schema graph comprising a set of attribute nodes and a set of type nodes corresponding to data within the heterogeneous data source, the local schema graph being separate and distinct from the heterogeneous data source, wherein an attribute node corresponds to a schema element in the heterogeneous data source comprising a domain with at least one value and is annotated with the value in the local schema graph, and wherein a type node corresponds to a schema element in the heterogeneous data source whose domain is defined recursively through at least one of one or more attribute nodes and one or more other type nodes, where local schema graphs for different types of heterogeneous data sources of the plurality of heterogeneous data sources are generated using a different schema discovery process;
generating, independent of receiving a query to be performed on the plurality of heterogeneous data sources, a global schema graph based on each local schema graph that has been generated, wherein the global schema graph comprises each of the local schema graphs and their components and further comprises at least one edge between at least one of two or more attributes nodes and two or more type nodes from different local schema graphs, and wherein the edge indicates a relationship between the data sources represented by the different local schema graphs comprising the two or more attributes nodes based on a computed similarity between at least one value associated with each of the two or more attributes nodes;
presenting a plurality of search results obtained from one or more of the plurality of heterogeneous data sources based on the global schema graph; and
providing guided data navigation of the search results through the user interface by displaying, for a search result selected from the plurality of search results, sample data and links to related attributes or types, wherein the links to the related attributes or types are selectable by a user through the user interface, and
displaying, for a selected link to one or more of the related attributes or one or more of the types, sample data of the one or more attributes or the one or more types associated with the selected link, and further displaying links to related attributes or types.

11. The information processing system of claim 10, wherein generating the local schema graph comprises:
determining that the heterogeneous data source comprises one of structured and semi-structured data;
identifying a plurality of elements in the one of structured and semi-structured data and a value associated with each element;
generating at least one root node, wherein the root node is a type node and represents the heterogeneous data source;
generating a node for each of the plurality of elements, wherein the node is one of an attribute node and a type node; and
annotating each attribute node with the value associated with the element represented by the attribute node.

12. The information processing system of claim 10, wherein generating the local schema graph comprises:
determining that the heterogeneous data source comprises relational data;
identifying at least one table in the relational data;
identifying each column within the table;
generating a type node representing the table;
generating an attribute node representing each column within the table;
annotating each attribute with at least at least one value in a record of the table; and
generating an edge between each attribute node and the type node.

13. The information processing system of claim 12, wherein generating the local schema graph further comprises:
identifying at least one additional table in the relational data;
generating at least one additional type node representing the additional table; and
generating an edge between the type node and the additional type node based on at least one foreign key relationship between the table and the additional table.

14. The information processing system of claim 10, wherein generating the local schema graph further comprises:
determining that the heterogeneous data source comprises Resource Description Framework-based data;
identifying at least one class in the Resource Description Framework-based data;
identifying each property with at least one value in the Resource Description Framework-based data associated with the class;
generating a type node for the class;
generating an attribute node for each property that has been identified; and
annotating each attribute node with the at least one value associated with the property represented by the attribute node.

15. The information processing system of claim 10, wherein the method further comprises:
   tokenizing and indexing each value from each local schema graph; and
   associating a uniform resource identifier with each value from each local schema graph based on the tokenizing and indexing.

16. A computer program product for virtualizing data across heterogeneous formats, the computer program product comprising:
   a non-transitory storage medium readable by a processing circuit and storing instructions for execution by the processing circuit for performing a method comprising:
      receiving, as input, a plurality of heterogeneous data sources;
      generating, independent of receiving a query to be performed on the plurality of heterogeneous data sources and after receiving the plurality of heterogeneous data sources as input and for each of the plurality of heterogeneous data sources, a local schema graph comprising a set of attribute nodes and a set of type nodes, corresponding to data within the heterogeneous data source the local schema graph being separate and distinct from the heterogeneous data source, wherein an attribute node corresponds to a schema element in the heterogeneous data source comprising a domain with at least one value and is annotated with the value in the local schema graph, and wherein a type node corresponds to a schema element in the heterogeneous data source whose domain is defined recursively through at least one of one or more attribute nodes and one or more other type nodes;
      generating, independent of receiving a query to be performed on the plurality of heterogeneous data sources, a global schema graph based on each local schema graph that has been generated, wherein the global schema graph comprises each of the local schema graphs and their components and further comprises at least one edge between at least one of two or more attributes nodes and two or more type nodes from different local schema graphs, and wherein the edge indicates a relationship between the data sources represented by the different local schema graphs comprising the two or more attributes nodes based on a computed similarity between at least one value associated with each of the two or more attributes nodes;
      presenting a plurality of search results obtained from one or more of the plurality of heterogeneous data sources based on the global schema graph; and
      providing guided data navigation of the search results through the user interface by
         displaying, for a search result selected from the plurality of search results, sample data and links to related attributes or types, wherein the links to the related attributes or types are selectable by a user through the user interface, and
         displaying, for a selected link to one or more of the related attributes or one or more of the types, sample data of the one or more attributes or the one or more types associated with the selected link, and further displaying links to related attributes or types.

17. The computer program product of claim 16, wherein generating the local schema graph comprises:
   determining that the heterogeneous data source comprises one of structured and semi-structured data;
   identifying a plurality of elements in the one of structured and semi-structured data and a value associated with each element;
   generating at least one root node, wherein the root node is a type node and represents the heterogeneous data source;
   generating a node for each of the plurality of elements, wherein the node is one of an attribute node and a type node; and
   annotating each attribute node with the value associated with the element represented by the attribute node.

18. The computer program product of claim 16, wherein generating the local schema graph comprises:
   determining that the heterogeneous data source comprises relational data;
   identifying at least one table in the relational data;
   identifying each column within the table;
   generating a type node representing the table;
   generating an attribute node representing each column within the table;
   annotating each attribute with at least at least one value in a record of the table; and
   generating an edge between each attribute node and the type node.

19. The computer program product of claim 18, wherein generating the local schema graph further comprises:
   identifying at least one additional table in the relational data;
   generating at least one additional type node representing the additional table; and
   generating an edge between the type node and the additional type node based on at least one foreign key relationship between the table and the additional table.

20. The computer program product of claim 16, wherein generating the local schema graph further comprises:
   determining that the heterogeneous data source comprises Resource Description Framework-based data;
   identifying at least one class in the Resource Description Framework-based data;
   identifying each property with at least one value in the Resource Description Framework-based data associated with the class;
   generating a type node for the class;
   generating an attribute node for each property that has been identified; and
   annotating each attribute node with the at least one value associated with the property represented by the attribute node.

* * * * *